(12) United States Patent
Ashfield et al.

(10) Patent No.: US 12,341,768 B2
(45) Date of Patent: Jun. 24, 2025

(54) COMPUTER-BASED SYSTEMS CONFIGURED TO AUTOMATICALLY GENERATE COMMUNICATION SCRIPTS ON A COMPUTING DEVICE AND METHODS OF USE THEREOF

(71) Applicant: Capital One Services, LLC, McLean, VA (US)

(72) Inventors: James Ashfield, Midlothian, VA (US); Clayton Johnson, Edgewood, MD (US); Daniel Alan Jarvis, Vienna, VA (US)

(73) Assignee: Capital One Services, LLC, McLean, VA (US)

( * ) Notice: Subject to any disclaimer, the term of this patent is extended or adjusted under 35 U.S.C. 154(b) by 217 days.

(21) Appl. No.: 18/329,819

(22) Filed: Jun. 6, 2023

(65) Prior Publication Data
US 2024/0414149 A1 Dec. 12, 2024

(51) Int. Cl.
*H04L 9/40* (2022.01)
*H04L 67/141* (2022.01)

(52) U.S. Cl.
CPC ........ *H04L 63/083* (2013.01); *H04L 63/1416* (2013.01); *H04L 63/1425* (2013.01); *H04L 67/141* (2013.01)

(58) Field of Classification Search
CPC . H04L 63/083; H04L 63/108; H04L 63/1416; H04L 63/1425; H04L 67/141
See application file for complete search history.

(56) References Cited

U.S. PATENT DOCUMENTS

| 9,965,606 | B2 | 5/2018 | Votaw et al. |
| 11,120,109 | B2 | 9/2021 | Toth et al. |
| 11,228,585 | B1 | 1/2022 | Alsolami et al. |
| 2018/0357714 | A1* | 12/2018 | So ............ G06N 5/022 |
| 2019/0250893 | A1* | 8/2019 | Pandit ............ G06N 20/00 |
| 2020/0307561 | A1* | 10/2020 | Bush ............ B60W 30/0956 |
| 2021/0158258 | A1* | 5/2021 | Alexander ............ G06N 5/041 |
| 2021/0273961 | A1* | 9/2021 | Humphrey ........... H04L 63/1425 |

FOREIGN PATENT DOCUMENTS

WO WO-2021171093 A1 * 9/2021 ........... G06F 21/554

* cited by examiner

*Primary Examiner* — Kostas J Katsikis
(74) *Attorney, Agent, or Firm* — Greenberg Traurig, LLP

(57) ABSTRACT

In some embodiments, the present disclosure provides an exemplary method that may include steps of receiving a permission indicator from a computing device of a user identifying a permission by the user to detect a plurality of interaction sessions; registering the computing device of the user as a token for subsequent authentication of the user; instructing the computing device to monitor a plurality of activities associated with the detected plurality of interaction sessions initiated; receiving an indication of a current interaction session being initiated at a current period of time to a particular data point stored with the prestored database of token data; dynamically determining a risk metric associated with the computing device; automatically authenticating the computing device associated with the user; transmitting the current interaction session to a queue; and automatically generating a script for the at least one agent.

20 Claims, 7 Drawing Sheets

COMPUTER-BASED SYSTEMS CONFIGURED TO AUTOMATICALLY GENERATE COMMUNICATION SCRIPTS ON A COMPUTING DEVICE AND METHODS OF USE THEREOF

FIELD OF TECHNOLOGY

The present disclosure generally relates to computer-based systems configured to automatically generate a communication script on a computing device and methods of use thereof.

BACKGROUND OF TECHNOLOGY

Typically, spam is directed to large numbers of users for the purposes of advertising, phishing, or spreading malware. Usually, spam includes all forms of unwanted communications including, but not limited to unsolicited calls or messages, caller identification spoofing, and/or robocalls. The goal or purpose of a spam call is to sell some goods that might be unsolicited or unwanted.

SUMMARY OF DESCRIBED SUBJECT MATTER

In some embodiments, the present disclosure provides an exemplary technically improved computer-based method that includes at least the following steps: receiving, by one or more processors, a permission indicator from a computing device of a user identifying a permission by the user to detect a plurality of interaction sessions being initiated by the computing device; registering, by the one or more processors, the computing device of the user as a token for subsequent authentication of the user based on token data associated with the user; instructing, by the one or more processors, the computing device to monitor a plurality of activities associated with the detected plurality of interaction sessions initiated by the computer device from a prestored database of token data associated with a plurality of users; receiving, by the one or more processors and in response to detecting the plurality of interaction sessions being initiated by the computing device, an indication of a current interaction session being initiated at a current period of time to a particular data point stored with the prestored database of token data, wherein the particular data point is associated with at least one entity; dynamically determining, by the one or more processors and in response to receiving the indication of the current interaction session being initiated at the current period of time, a risk metric associated with the computing device based on a plurality of indicative vectors; automatically authenticating, by the one or more processors, the computing device associated with the user based on a comparison of the risk metric to the token data associated with the user; transmitting, by the one or more processors, the current interaction session to a queue so that the current interaction session is received by at least one agent associated with the at least one entity in response of a generation of an authentication status associated with the computing device; and automatically generating, by the one or more processors, a script for the at least one agent based on the generation of the authentication status and the token data associated with the user.

In some embodiments, the present disclosure provides an exemplary technically improved computer-based system that includes a non-transient computer memory, storing software instructions; at least one processor of a first computing device associated with a user; where, when the at least one processor executes the software instructions, the first computing device is programmed to receive, by one or more processors, a permission indicator from a computing device of a user identifying a permission by the user to detect a plurality of interaction sessions being initiated by the computing device; register, by the one or more processors, the computing device of the user as a token for subsequent authentication of the user based on token data associated with the user; instruct, by the one or more processors, the computing device to monitor a plurality of activities associated with the detected plurality of interaction sessions initiated by the computer device from a prestored database of token data associated with a plurality of users; receive, by the one or more processors and in response to detecting the plurality of interaction sessions being initiated by the computing device, an indication of a current interaction session being initiated at a current period of time to a particular data point stored with the prestored database of token data, wherein the particular data point is associated with at least one entity; dynamically determine, by the one or more processors and in response to receiving the indication of the current interaction session being initiated at the current period of time, a risk metric associated with the computing device based on a plurality of indicative vectors; automatically authenticate, by the one or more processors, the computing device associated with the user based on a comparison of the risk metric to the token data associated with the user; transmit, by the one or more processors, the current interaction session to a queue so that the current interaction session is received by at least one agent associated with the at least one entity in response of a generation of an authentication status associated with the computing device; and automatically generate, by the one or more processors, a script for the at least one agent based on the generation of the authentication status and the token data associated with the user.

BRIEF DESCRIPTION OF DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
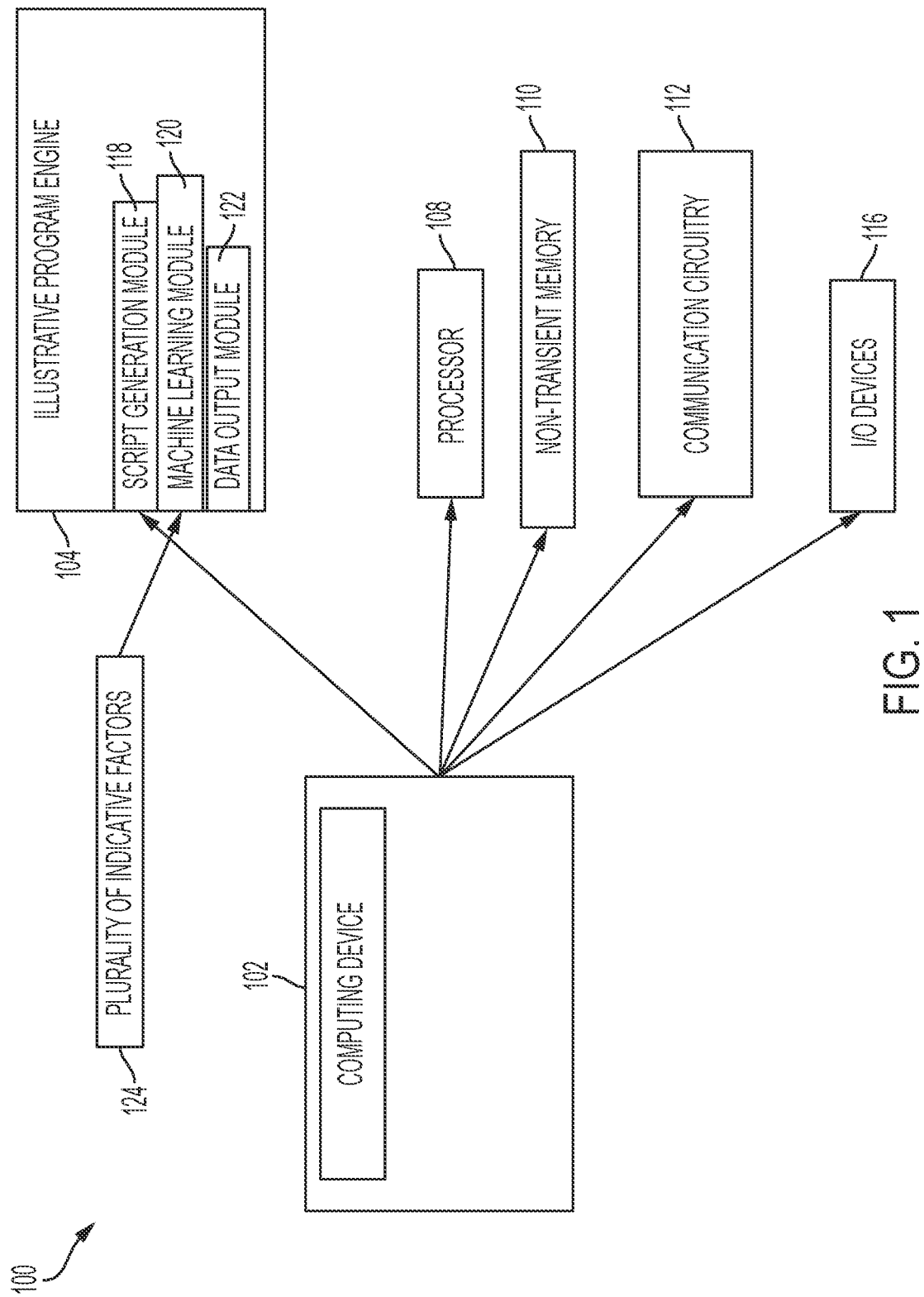
FIG. 1 depicts a block diagram of an exemplary computer-based system and platform for automatically generating a script for the at least one agent based on a generation of an authentication status and token data associated with a user, in accordance with one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a creator interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, daily, several days, weekly, monthly, etc.

As used herein, the term "runtime" corresponds to any behavior that is dynamically determined during an execution of a software application or at least a portion of software application.

At least some embodiments of the present disclosure are directed to solve at least one technological computer-centered problem associated with delays associated with answering customer calls as a call service system. An illustrative technological computer-centered problem associated with the delays associated with answering customer calls as the call service system typically arises when the call service system needs to simultaneously authenticate a plurality of incoming calls associated with a plurality of customers at the call service system, may increase a the time needed for an agent to answer one of these calls and/or decrease customer experience for each customer who has to wait for a lengthy period of time. As detailed in at least some embodiments herein, at least one technological computer-centered solution addressing the illustrative technological computer-centered problem may be to automatically authenticate the computer device associated with the user based on a comparison of the risk metric to the token data associated with the user. In some embodiments, the present disclosure details that one practical solution may be to receive an indication of a current interaction session being initiated at a current period of time to a particular data point stored within a pre-stored database. For example, the present disclosure may determine that at indication of the current interaction action session being initiated at the current period of time is associated with at least one entity. In some embodiments, the present disclosure details that one practical solution may be to register a computing device of at least one individual as a token for subsequent authentication of the at least one individual based on token data. In some embodiments, the present disclosure details that one practical solution may be to monitor a plurality of activities associated with a detected plurality of interaction sessions initiated by the computer device from a prestored database of token data. In some embodiments, the present disclosure details that one practical solution may be to dynamically determine a risk metric associated with the computing device based on a plurality of indicative vectors. In some embodiments, the present disclosure details that one practical solution may be to automatically authenticate the computing device associated with the user based on a comparison of the risk metric to the token data associated with the user.

FIG. 1 depicts a block diagram of an exemplary computer-based system and platform for determining at least one positive match between at least one data point within the generated database of known queries and the subsequent input data received from the at least one external data aggregator, in accordance with one or more embodiments of the present disclosure.

In some embodiments, an illustrative computing system 100 of the present disclosure may include a computing device 102 associated with at least one user and an illustrative program engine 104. In some embodiments, the illustrative program engine 104 may be stored on the computing device 102. In some embodiments, the illustrative program engine 104 may be stored on the computing device 102, which may include a processor 108, a non-transient memory 110, a communication circuitry 112 for communicating over a communication network 114 (not shown), and input and/or output (I/O) devices 116 such as a keyboard, mouse, a touchscreen, and/or a display, for example. In some embodiments, the computing device 102 may refer to at least one calling-enabled computing device of a plurality of calling-enabled computing devices. For example, the computing device 102 may refer to a smart phone and/or telecommunication server computing device.

In some embodiments, the illustrative program engine 104 may be configured to instruct the processor 108 to execute one or more software modules such as, without limitation, an exemplary script generation module 118, a machine-learning module 120, and/or a data output module 122.

In some embodiments, an exemplary script generation module 118 of the present disclosure, may utilize at least one trained machine learning algorithm, described herein, to automatically generate a script for at least one agent associated with an external computing device based on a generation of an authentication status and token data associated with a user. In some embodiments, the exemplary script generation module 118 may receive a permission indicator from a computing device 102 of the user identifying a permission by the user to detect a plurality of interaction sessions being initiated by the computing device 102. In certain embodiments, the interaction sessions being initiated by the computing device 102 may include phone calls, conference calls and/or email transmissions. In some embodiments, the exemplary script generation module 118 may register the computing device 102 of the user as a token for subsequent authentication of the user based on token data associated with the user. In certain embodiments, the token data may refer to personal information associated with the user, a plurality of preferences associated with the user, and/or performance information associated with the computing device 102 of the user. In some embodiments, the exemplary script generation module 118 may monitor a plurality of activities associated with the detected plurality of interaction session initiated by the computer device 102 from a prestored database of token data associated with a plurality of users. In certain embodiments, the prestored database of token data associated with the plurality of users may refer to a plurality of subsets associated to a phone number entered by the user to initiate calls based at least in part on a stored database of one or more phone numbers associated with at least one entity. In some embodiments, the exemplary script generation module 118 may instruct the computing device 102 to monitor the plurality of activities associated with the detected plurality of interaction session initiated by the computer device 102 from the prestored database of token data associated with a plurality of users. For example, the plurality of activities may refer to dialing a phone number, texting a phone number, emailing a particular email address, and receiving a communication from an external device, etc. In some embodiments, the exemplary script generation module 118 may receive an indication of a current interaction session being initiated at a current period of time to a particular data point stored with the prestored database of token data. In certain embodiments, the current interaction session may refer to a call identified based on SIP certificate associated with an identity of the user. In certain embodiments, the prestored database of token data may refer to a plurality of subsets associated with a phone number entered by the user to initiate the call based at least in part on a stored database of one or more phone numbers associated with the at least one entity based on the identification of the SIP certificate. In certain embodiments, the particular data point may refer to at least one phone number associated at least one entity. In certain embodiments, the indication of the current interaction session being initiated at the current period of time may refer to dynamically requesting to authenticate the user based on the registration associated with the token data. In some embodiments, the exemplary script generation module 118 may dynamically determine a risk metric associated with the computing device 102 based on a plurality of indicative vectors 124. For example, the plurality of indicative vectors 124 includes at least one of a behavioral metric vector, a hardware risk metric vector, or a software risk metric vector. In some embodiments, the behavioral metric vector may refer to a plurality of preferences associated with the user. In certain embodiments, an example of the behavior metric vector may refer to a risk type that the users ranks as a risk, such as spam prevention. In some embodiments, the hardware risk metric vector may refer to a risk metric associated with the functionality of the computing device 102. In certain embodiments, the example of the hardware risk metric vectors is available memory available and processing power associated with the computing device 102. In some embodiments, the software metric vector may refer to a risk associated with the software with the computing device 102, particularly the illustrative program engine 104. In certain embodiments, the example of the software risk metric vector may refer to an update required for the illustrative program engine 104. In some embodiments, the exemplary script generation module 118 may automatically authenticate the computing device 102 associated with the user based on a comparison of the risk to the token data associated with the user. In some embodiments, the exemplary script generation module 118 may transmit the current interaction session to a queue so that the current interaction session is received by at least one agent associated with the at least one entity in response of a generation of an authentication status associated with the computing device 102. In some embodiments, the exemplary script generation module 118 may dynamically calculate the risk metric associated with the computing device 102 by aggregating the plurality of indicative vectors 124 and a precalculated risk threshold associated with the computing device 102 based on a plurality of preferences associated with the user. In some embodiments, the exemplary script generation module 118 may automatically display a generated script and the authentication status associated with the current interaction session for the at least one agent to utilize during the current interaction session.

In some embodiments, the present disclosure describes systems for automatically utilizing the at least one trained machine learning algorithm/model of a plurality of trained machine learning algorithms within the machine learning module 120 that may determine a risk metric associated with the computing device 102 based on a plurality of indicative vectors 124. In some embodiments, the machine learning module 120 may dynamically determine the risk metric associated with the computing device 102 based on the plurality of indicative vectors 124 in response to receiving the indication of the current interaction session being initiated at the current period of time. In some embodiment, the machine learning module 120 automatically authenticate the computing device 102 associated with the user based on a comparison of the risk metric to the token data associated with the user. In some embodiments, the machine learning module 120 may transmit the current interaction session to a queue so that the current interaction session is received by at least one agent associated with the at least one entity in response of a generation of an authentication status associated with the computing device 102. In some embodiments, the machine learning module 120 may automatically generate the script for the at least one agent based on the generation of the authentication status and the token data associated with the user. In some embodiments, the machine learning module 120 may calculate the risk metric associated with the computing device 102 by aggregating the plurality of indicative vectors 124 and the precalculated risk threshold associated with the computing device 102 based on a plurality of preferences associated with the user. In certain embodiments, the machine learning module 120 may assign a value for each indicative vector associated with a risk level related to the precalculated risk threshold. For example. the machine learning module 120 may assign at least one value for at least one of a behavioral metric vector, a hardware risk metric vector, or a software risk metric vector. In certain embodiments, each vector may have a different range of values based on the preferences of the user, the specifications associated with the computing device 102 and the sophistication associated with the illustrative program engine 104. In certain embodiments, the values associated with each vector of the plurality of indicative vectors 124 may be uniformly standardized for optimal aggregation. In some embodiments, the machine learning module 120 may automatically displaying a generated script and the authentication status associated with the current interaction session for the at least one agent to utilize during the current interaction session. In certain embodiments, the machine learning module 120 may refer to the trained machine learning algorithm trained using an unsupervised learning and/or a semi-supervised learning for the predetermined period of time. For example, the machine learning module may include at least one of regression algorithm, instance-based algorithm, regularization algorithm, decision tree algorithm, Bayesian algorithm, clustering algorithm, associated rule learning algorithm, deep learning algorithm, dimensionality reduction algorithm, ensemble algorithm, and/or artificial neural network algorithm.

In some embodiments, the data output module 122 may receive an indication of a current interaction sessions being initiated by the computing device, an indication of a current interaction session being initiated at a current period of time to a particular data point stored with the prestored database of token data. In some embodiments, the data output module 122 may determine the risk metric associated with the computing device 102 based on the plurality of indicative vectors 124. In some embodiments, the data output module 122 may automatically authenticate the computing device 102 associated with the user based on a comparison of the risk metric to the token data associated with the user. In some embodiments, the data output module 122 may transmit the current interaction session to a queue so that the current interaction session is received by at least one agent associated with the at least one entity in response to a generation of authentication status associated with the computing device 102. In some embodiments, the data output module 122 may automatically generate a script for the at least one agent based on the generation of the authentication status and the token data associated with the user.

In some embodiments, the illustrative program engine 104 may receive a permission indicator from the computing device 102 of a user identifying a permission by the user to detect a plurality of interaction sessions being initiated by the computing device 102. In some embodiments, the illustrative program engine 104 may register the computing device 102 of the user as a token for subsequent authentication of the user based on token data associated with the user. In some embodiments, the illustrative program engine 104 may instruct the computing device 102 to monitor a plurality of activities associated with the detected plurality of interaction sessions initiated by the computer device 102 from a prestored database of token data associated with a plurality of users. In some embodiments, the illustrative program engine 104 may receive an indication of a current interaction session being initiated at a current period of time to a particular data point stored with the prestored database of token data. In some embodiments, the illustrative program engine 104 may dynamically determine a risk metric associated with the computing device 102 based on a plurality of indicative vectors 124. In some embodiments, the illustrative program engine 104 may automatically authenticate the computing device 102 associated with the user based on a comparison of the risk metric to the token data associated with the user. In some embodiments, the illustrative program engine 104 may transmit the current interaction session to a queue so that the current interaction session is received by at least one agent associated with the at least one entity in response to a generation of an authentication status associated with the computing device 102. In some embodiments, the illustrative program engine 104 may authentically generate a script for the at least one agent based on the generation of the authentication status and the token data associated with the user.

In some embodiments, the non-transient memory 110 may store the permission by the user to detect the plurality of interaction sessions being initiated by the computing device 102. In some embodiments, the non-transient memory 110 may store the token data associated with the user for subsequent authentication. In some embodiments, the non-transient memory 110 may store the detected plurality of interaction sessions initiated by the computing device 102. In some embodiments, the non-transient memory 110 may store the database of token data associated with the plurality of users and the plurality of activities associated with the computing device 102. In some embodiments, the non-transient memory 110 may store a dynamic determination of a risk metric associated with the computing device based on a plurality of indicative vectors 124. In some embodiments, the non-transient memory 110 may store an automatic authentication for the computing device 102 associated with the user based on a comparison of the risk metric to the token data associated with the user. In some embodiments, the non-transient memory 110 may store a queue associated with the current interaction session received by at least one agent associated with the at least one entity. In some embodiments, the non-transient memory 110 may store an automatically generated script for the at least one agent based on the generation of the authentication status and the token data associated with the user.

Figure 2:
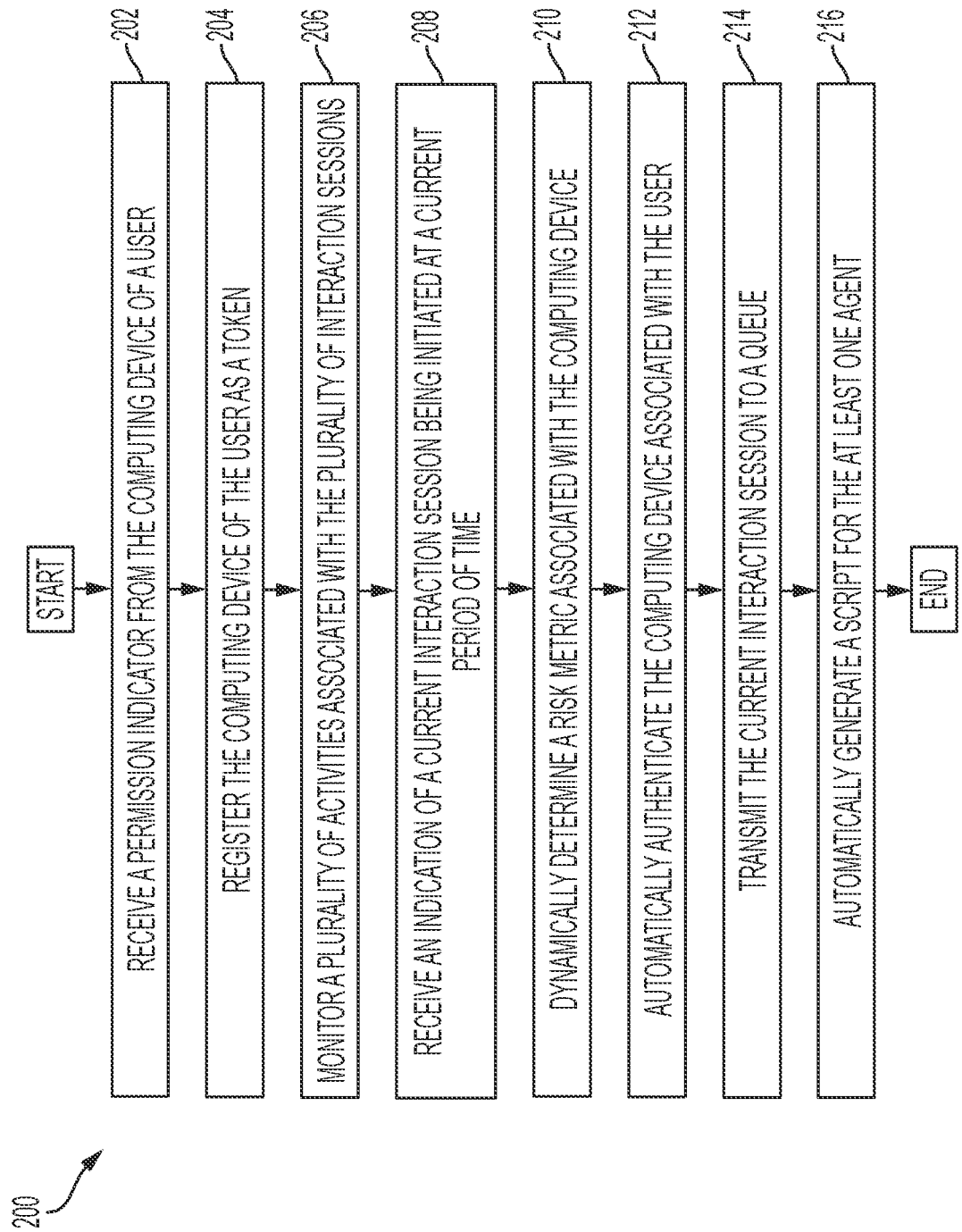
FIG. 2 is a flowchart illustrating operational steps of automatically generating a script for the at least one agent based on a generation of an authentication status and token data associated with a user, in accordance with one or more embodiments of the present disclosure.

FIG. 2 is a flowchart 200 illustrating operational steps for automatically generating a script for the at least one agent based on a generation of an authentication status and token data associated with a user, in accordance with one or more embodiments of the present disclosure.

In step 202, the illustrative program engine 104 within the computing device 102 may be programmed to receive a permission indicator from the computing device 102 of a user. In some embodiments, the illustrative program engine 104 may receive the permission indicator from the computing device 102 of the user by identifying a permission by the user to detect a plurality of interaction sessions being initiated by the computing device 102. In certain embodiments, the permission indicator may refer to a response generated by the user to allow the computing device 102 to detect subsequent actions. For example, the plurality of interaction sessions being initiated by the computing device

102 may include phone calls, conference calls, and email transmissions. In some embodiments, the exemplary script generation module 118 may receive the permission indicator from the computing device 102 of the user by identifying the permission by the user to detect the plurality of interaction sessions being initiated by the computing device 102.

In step 204, the illustrative program engine 104 may register the computing device 102 of the user as a token. In some embodiments, the illustrative program engine 104 may register the computing device 102 of the user as the token for subsequent authentication of the user based on token data associated with the user. In certain embodiments, the token data may refer to personal information associated with the user, a plurality of preferences associated with the user, and performance information associated with the computing device 102 of the user. In some embodiments, the illustrative program engine 104 may utilize the token data to optimize performance and/or assist in detecting at least one interaction session based on the personal information, the plurality of preferences, and the performance information associated with the computing device 102. In some embodiments, the exemplary script generation module 118 may register the computing device 102 of the user as the token for subsequent authentication of the user based on token data associated with the user.

In step 206, the illustrative program engine 104 may monitor a plurality of activities associated with the plurality of interaction sessions. In some embodiments, the illustrative program engine 104 may monitor the plurality of activities associated with the plurality of interaction sessions initiated by the computing device 102 from a prestored databased of token data associated with a plurality of users. In some embodiments, the illustrative program engine 104 may instruct the computing device 102 to monitor the plurality of activities associated with the plurality of interaction sessions initiated by the computing device 102 from the prestored databased of token data associated with the plurality of users. In certain embodiments, the prestored database of token data associated with the plurality of users may refer to a plurality of subsets associated to a phone number entered by the user to initiate calls based at least in part on a stored database of one or more phone numbers associated with at least one entity. In some embodiments, the exemplary script generation module 118 may instruct the computing device 102 to monitor the plurality of activities associated with the plurality of interaction sessions initiated by the computing device 102 from the prestored databased of token data associated with the plurality of users.

In step 208, the illustrative program engine 104 may receive an indication of a current interaction session being initiated at a current period of time. In some embodiments, the illustrative program engine 104 may receive the indication of the current interaction session being initiated at the current period of time in response to detecting the plurality of interaction sessions being initiated by the computing device 102. In some embodiments, the illustrative program engine 104 may receive the indication of the current interaction session being initiated at the current period of time to a particular data point stored with the prestored database of token data in response to detecting the plurality of interaction sessions being initiated by the computing device 102. In certain embodiments, the particular data point may refer to a at least one data point associated with a particular entity. For example, the particular data point may refer to a verified phone number associated with the particular entity. In certain embodiments, the indication of the current interaction session being initiated at the current period of time may refer to a dynamic request to authenticate the user based on a registration associated with the token data. In some embodiments, the exemplary script generation module 118 may receive the indication of the current interaction session being initiated at the current period of time to the particular data point stored with the prestored database of token data in response to detecting the plurality of interaction sessions being initiated by the computing device 102.

In step 210, the illustrative program engine 104 may dynamically determine a risk metric associated with the computing device 102. In some embodiments, the illustrative program engine 104 may dynamically determine the risk metric associated with the computing device 102 in response to receiving the indication of the current interaction session being initiated at the current period of time. In some embodiments, the illustrative program engine 104 may dynamically determine the risk metric associated with the computing device 102 based on a plurality of indicative vectors 124 in response to receiving the indication of the current interaction session being initiated at the current period of time. In certain embodiments, the plurality of indicative vectors 124 may refer to a plurality of vectors that may be used to calculate the risk metric associated with the computing device 102, where each vector is assigned a value. For example, the plurality of indicative vectors 124 may refer to at least one of, but not limited to, a behavioral metric vector, a hardware risk metric vector, or a software risk metric vector. In some embodiments, the illustrative program engine 104 may calculate the risk metric associated with the computing device 102 by aggregating the plurality of indicative vectors 124 and comparing the aggregation to a predetermined threshold of risk. In some embodiments, the exemplary script generation module 118 may dynamically determine the risk metric associated with the computing device 102 based on the plurality of indicative vectors 124 in response to receiving the indication of the current interaction session being initiated at the current period of time. In some embodiments, the exemplary script generation module 118 may calculate the risk metric associated with the computing device 102 by aggregating the plurality of indicative vectors 124 and comparing the aggregation to the predetermined threshold of risk.

In step 212, the illustrative program engine 104 may automatically authenticate the computing device 102 associated with the user. In some embodiments, the illustrative program engine 104 may automatically authenticate the computing device 102 associated with the user based on a comparison of the risk metric to the token data associated with the user. In some embodiments, the exemplary script generation module 118 may automatically authenticate the computing device 102 associated with the user based on the comparison of the risk metric to the token data associated with the user.

In step 214, the illustrative program engine 104 may transmit the current interaction session to a queue. In some embodiments, the illustrative program engine 104 may transmit the current interaction session to the queue so that the current interaction session is received by at least one agent. In some embodiments, the illustrative program engine 104 may transmit the current interaction session to the queue so that the current interaction session is received by the at least one agent associated with the at least one entity. For example, the at least one entity may refer to a financial institution, a governmental agency, a merchant, a company, a credit card issuer, and an insurance provider, etc. In certain embodiments, the at least one agent associated with the at least one entity may refer to an employee that manages inbound and outbound customer calls for an organization. In certain embodiments, the transmission of the current interaction session to the queue may refer to placing the current interaction session on hold for a predetermined period of time. In some embodiments, the illustrative program engine 104 may transmit the current interaction session to the queue so that the current interaction session is received by the at least one agent associated with the at least one entity in response of a generation of an authentication status associated with the computing device 102. In some embodiments, the exemplary script generation module 118 may transmit the current interaction session to the queue so that the current interaction session is received by the at least one agent associated with the at least one entity in response of the generation of an authentication status associated with the computing device 102. In certain embodiments, the authentication status may refer to a verification based on the token data associated with the user and the computing device 102.

In step 216, the illustrative program engine 104 may automatically generate a script for the at least one agent. In some embodiments, the illustrative program engine 104 may automatically generate the script for the at least one agent based on the generation of the authentication status and the token data associated with the user. In certain embodiments, the script may refer to a scripted set of dialogue to optimize the current interaction session between the user and the at least one agent associated with the at least one entity. In some embodiments, the exemplary script generation module 118 may automatically generate the script for the at least one agent based on the generation of the authentication status and the token data associated with the user. In some embodiments, the illustrative program engine 104 may automatically display a generated script and the authentication status associated with the current interaction session for the at least one agent to utilize during the current interaction session. In some embodiments, the exemplary script generation module 118 may automatically display the generated script and the authentication status associated with the current interaction session for the at least one agent to utilize during the current interaction session.

Figure 3:
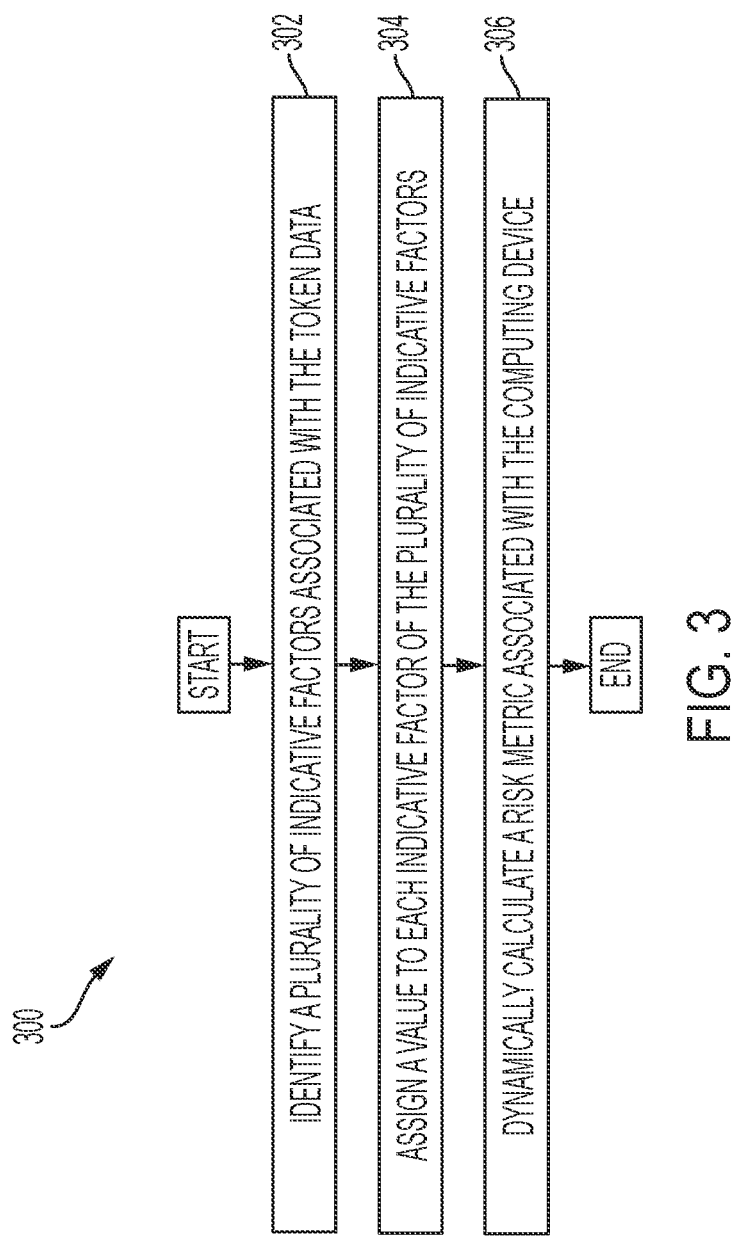
FIG. 3 is a flowchart illustrating operational step of dynamically calculating a risk metric associated with the computing device, in accordance with one or more embodiments of the present disclosure.

FIG. 3 is a flowchart 300 illustrating operational steps of dynamically calculating a risk metric associated with the computing device 102, in accordance with one or more embodiments of the present disclosure.

In step 302, the illustrative program engine 104 may identify a plurality of indicative factors associated with the token data. In some embodiments, the illustrative program engine 104 may identify the plurality of indicative factors by detecting the plurality of interaction sessions being initiated and utilizing the machine learning module 120 to determine a presence of at least one indicative factor of the plurality of indicative factors. In certain embodiments, the plurality of indicative vectors 124 may refer to at least one of, but not limited to, a behavioral metric vector, a hardware risk metric vector, or a software risk metric vector. In some embodiments, the exemplary script generation module 118 may identify the plurality of indicative factors by detecting the plurality of interaction sessions being initiated and utilizing the machine learning module 120 to determine the presence of at least one indicative factor of the plurality of indicative factors.

In step 304, the illustrative program engine 104 may assign a value to each indicative factor of the plurality of indicative factors. In some embodiments, the illustrative program engine 104 may assign the value to each indicative factor of the plurality of indicative factors. In certain embodiments, the illustrative program engine 104 may assign the values uniformly across the plurality of indicative factors; while in other embodiments, the illustrative program engine 104 may assign a specific value to a particular indicative based on a type of interaction session and authentication status associated with the current interaction session and the token data associated with the user. In some embodiments, the exemplary script generation module 118 may assign the value to each indicative factor of the plurality of indicative factors.

In step 306, the illustrative program engine 104 may dynamically calculate a risk metric associated with the computing device 102. In some embodiments, the illustrative program engine 104 may dynamically calculate the risk metric associated with the computing device 102 by aggregating the assigned value of each indicative factor identified to be present in the token data of the plurality of indicative factors. For example, the illustrative program engine 104 may calculate a risk metric of two when the only indicative factors identified are the hardware risk metric vector and the software risk metric vector. In some embodiments, the illustrative program engine 104 may dynamically compare the aggravated values of the identified indicative vectors 124 to the predetermined threshold of risk associated with the computing device 102 to determine the authentication status associated with the user and the token data. In some embodiments, the exemplary script generation module 118 may dynamically calculate the risk metric associated with the computing device 102 by aggregating the assigned value of each indicative factor identified to be present in the token data of the plurality of indicative factors. In some embodiments, the exemplary script generation module 118 may dynamically compare the aggravated values of the identified indicative vectors 124 to the predetermined threshold of risk associated with the computing device 102 to determine the authentication status associated with the user and the token data.

Figure 4:
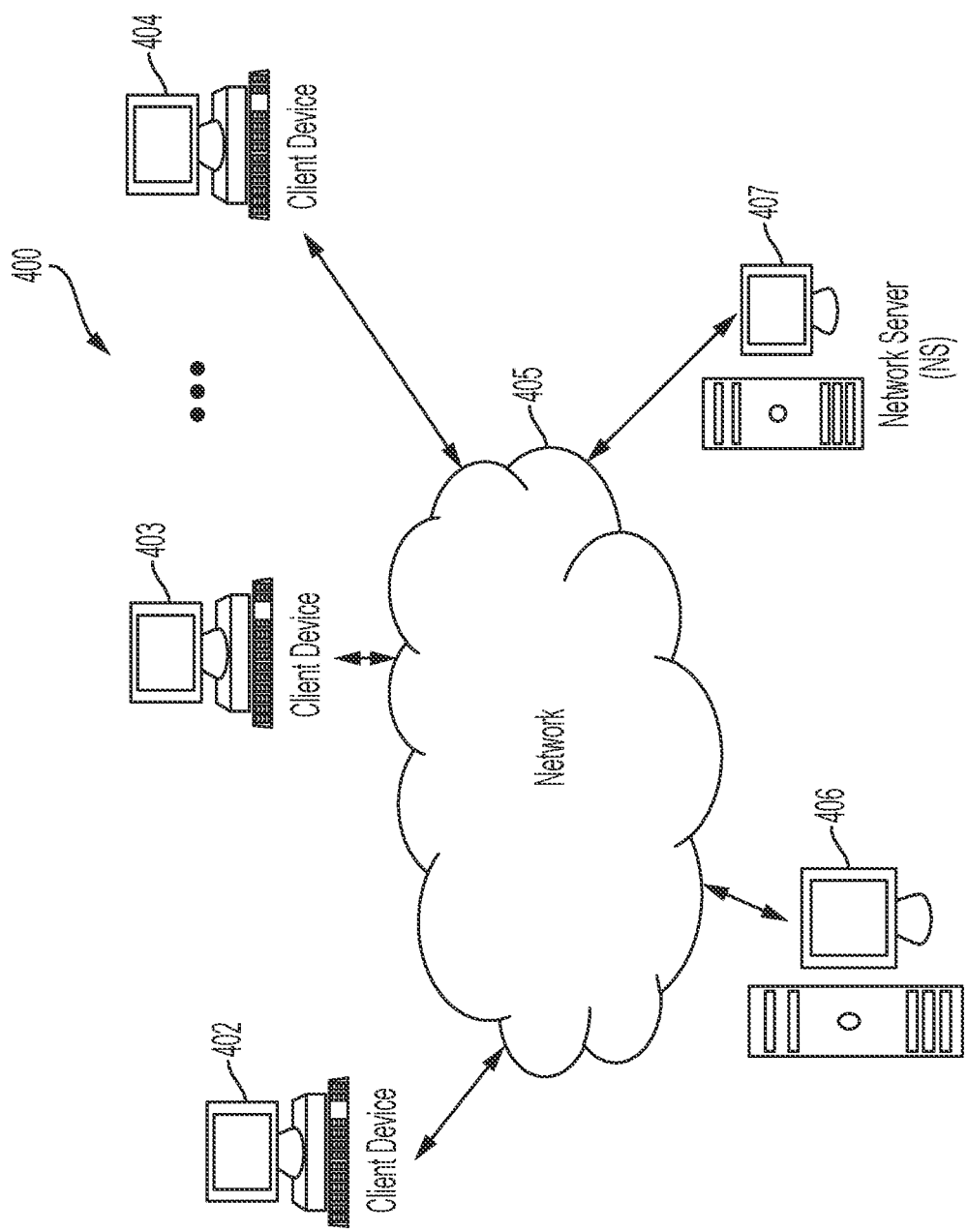
FIG. 4 depicts a block diagram of an exemplary computer-based system/platform in accordance with one or more embodiments of the present disclosure.

FIG. 4 depicts a block diagram of an exemplary computer-based system/platform 400 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform 400 may be configured to automatically authenticate the computing device 102 associated with the user based on a comparison of a dynamically calculated risk metric to the token data associated with the user and automatically generate a script for the at least one agent based on the generation of the authentication status and the token data associated with the user, as detailed herein. In some embodiments, the exemplary computer-based system/platform 400 may be based on a scalable computer and/or network architecture that incorporates varies strategies for assessing the data, caching, searching, and/or database connection pooling. An example of the scalable architecture is an architecture that is capable of operating multiple servers. In some embodiments, the exemplary inventive computing devices and/or the exemplary inventive computing components of the exemplary computer-based system/platform 400 may be configured to remotely execute the instructions associated with the exemplary script generation module 118 of the present disclosure, automatically utilizing at least one machine-learning model described herein.

In some embodiments, referring to FIG. 4, members 402-404 (e.g., clients) of the exemplary computer-based system/platform 400 may include virtually any computing device capable of automatically authenticating the computing device 102 associated with the user based on a comparison of a dynamically calculated risk metric to the token data associated with the user and automatically generating a script for the at least one agent based on the generation of the authentication status and the token data associated with the user via a network (e.g., cloud network 109), such as network 405, to and from another computing device, such as servers 406 and 407, each other, and the like. In some embodiments, the member devices 402-404 may be smart phones, personal computers, multiprocessor systems, microprocessor-based or programmable consumer electronics, network PCs, and the like. In some embodiments, one or more member devices within member devices 402-404 may include computing devices that connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 402-404 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 402-404 may include may launch one or more applications, such as Internet browsers, mobile applications, voice calls, video games, videoconferencing, and email, among others. In some embodiments, one or more member devices within member devices 402-404 may be configured to receive and to send web pages, and the like. In some embodiments, the exemplary script generation module 118 of the present disclosure may be configured to automatically generate the script for the at least one agent based on the generation of the authentication status and the token data associated with the user and employ virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 402-404 may be specifically programmed by either Java, .Net, QT, C, C++ and/or other suitable programming language. In some embodiments, one or more member devices within member devices 402-404 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 405 may provide network access, data transport and/or other services to any computing device coupled to it. In some embodiments, the exemplary network 405 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 405 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 405 may include and implement, as an alternative or in conjunction with one or more of the above, a WiMAX architecture defined by the WiMAX forum. In some embodiments and, optionally, in combination of any embodiment described above or below, the exemplary network 405 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 405 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 405 may also include mass storage, such as network attached storage (NAS), a storage area network (SAN), a content delivery network (CDN) or other forms of computer or machine-readable media.

In some embodiments, the exemplary server 406 or the exemplary server 407 may be a web server (or a series of servers) running a network operating system, examples of which may include but are not limited to Microsoft Windows Server, Novell NetWare, or Linux. In some embodiments, the exemplary server 406 or the exemplary server 407 may be used for and/or provide cloud and/or network computing. Although not shown in FIG. 4, in some embodiments, the exemplary server 406 or the exemplary server 407 may have connections to external systems like email, SMS messaging, text messaging, ad content providers, etc. Any of the features of the exemplary server 406 may be also implemented in the exemplary server 407 and vice versa.

In some embodiments, one or more of the exemplary servers 406 and 407 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 401-404.

In some embodiments and, optionally, in combination of any embodiment described above or below, for example, one or more exemplary computing member devices 402-404, the exemplary server 406, and/or the exemplary server 407 may include a specifically programmed software module that may be configured to automatically authenticate the computing device 102 associated with the user based on a comparison of a dynamically calculated risk metric to the token data associated with the user and automatically generate a script for the at least one agent based on the generation of the authentication status and the token data associated with the user.

Figure 5:
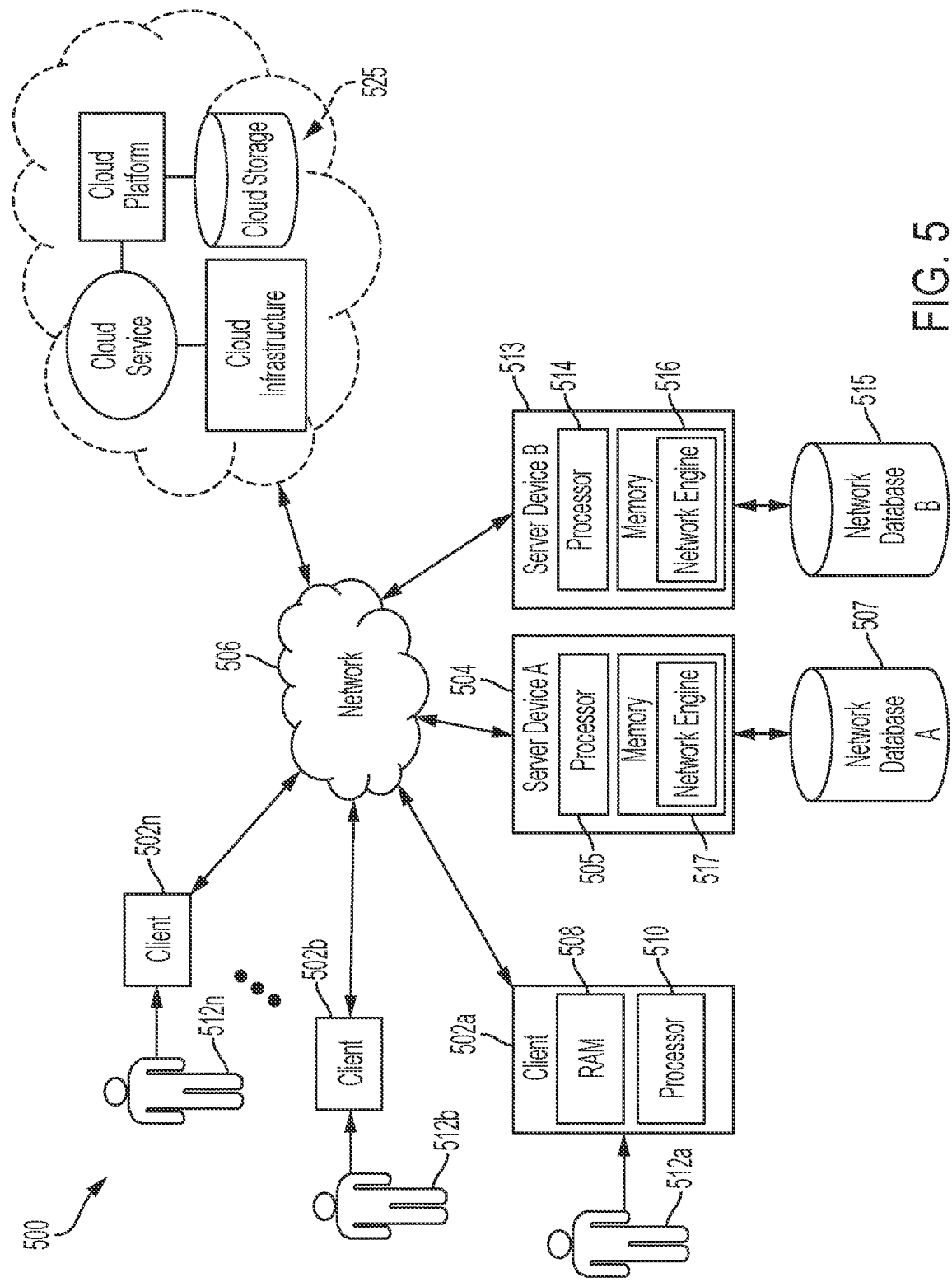
FIG. 5 depicts a block diagram of another exemplary computer-based system/platform in accordance with one or more embodiments of the present disclosure

FIG. 5 depicts a block diagram of another exemplary computer-based system/platform 500 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 502a, 502b thru 502n shown each at least includes a computer-readable medium, such as a random-access memory (RAM) 508 coupled to a processor 510 or FLASH memory. In some embodiments, the processor 510 may execute computer-executable program instructions stored in memory 508. In some embodiments, the processor 510 may include a microprocessor, an ASIC, and/or a state machine. In some embodiments, the processor 510 may include, or may be in communication with, media, for example computer-readable media, which stores instructions that, when executed by the processor 510, may cause the processor 510 to perform one or more steps described herein. In some embodiments, examples of computer-readable media may include, but are not limited to, an electronic, optical, magnetic, or other storage or transmission device capable of providing a processor, such as the processor 510 of client 502a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 502a through 502n may also comprise a number of external or internal devices such as a mouse, a CD-ROM, DVD, a physical or virtual keyboard, a display, a speaker, or other input or output devices. In some embodiments, examples of member computing devices 502a through 502n (e.g., clients) may be any type of processor-based platforms that are connected to a network 506 such as, without limitation, personal computers, digital assistants, personal digital assistants, smart phones, pagers, digital tablets, laptop computers, Internet appliances, and other processor-based devices. In some embodiments, member computing devices 502a through 502n may be specifically programmed with one or more application programs in accordance with one or more principles/methodologies detailed herein. In some embodiments, member computing devices 502a through 502n may operate on any operating system capable of supporting a browser or browser-enabled application, such as Microsoft™ Windows™, and/or Linux. In some embodiments, member computing devices 502a through 502n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 502a through 502n, users, 512a through 512n, may communicate over the exemplary network 506 with each other and/or with other systems and/or devices coupled to the network 506. As shown in FIG. 5, exemplary server devices 504 and 513 may be also coupled to the network 506. Exemplary server device 504 may include a processor 505 coupled to a memory that stores a network engine 517. Exemplary server device 513 may include a processor 514 coupled to a memory 516 that stores a network engine. In some embodiments, one or more member computing devices 502a through 502n may be mobile clients. As shown in FIG. 5, the network 506 may be coupled to a cloud computing/architecture(s) 525. The cloud computing/architecture(s) 525 may include a cloud service coupled to a cloud infrastructure and a cloud platform, where the cloud platform may be coupled to a cloud storage.

In some embodiments, at least one database of exemplary databases 507 and 515 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 6:
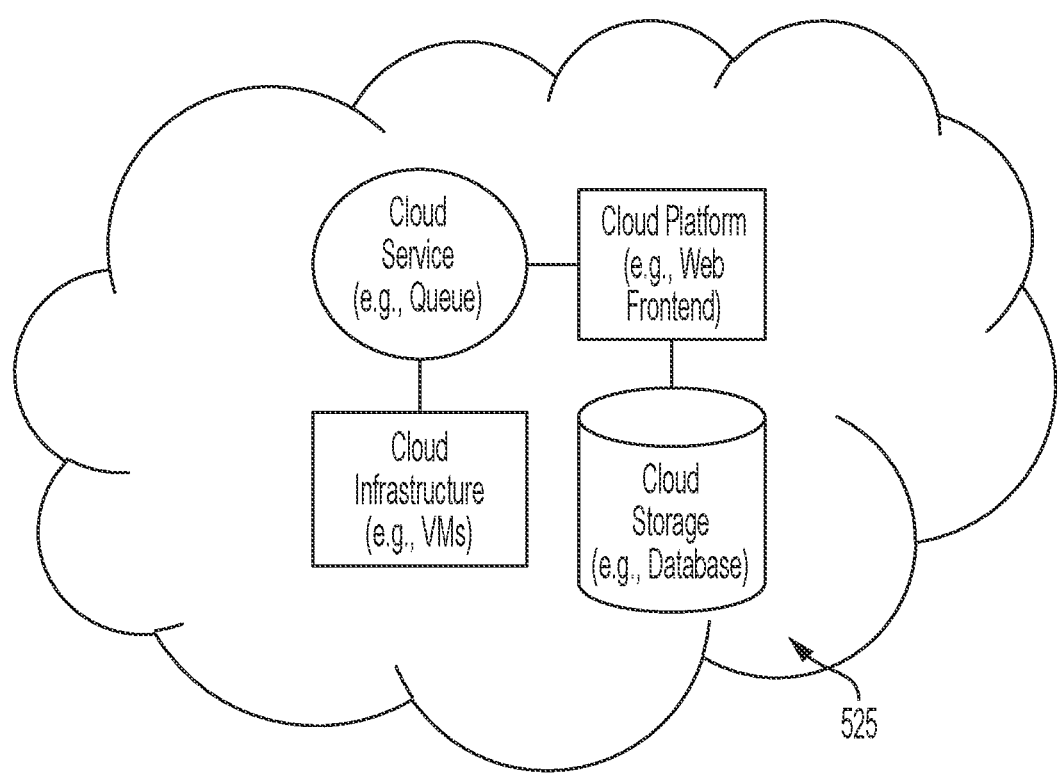
FIGS. 6 and 7 are diagrams illustrating implementations of cloud computing architecture/aspects with respect to which the disclosed technology may be specifically configured to operate, in accordance with one or more embodiments of the present disclosure.
Figure 7:
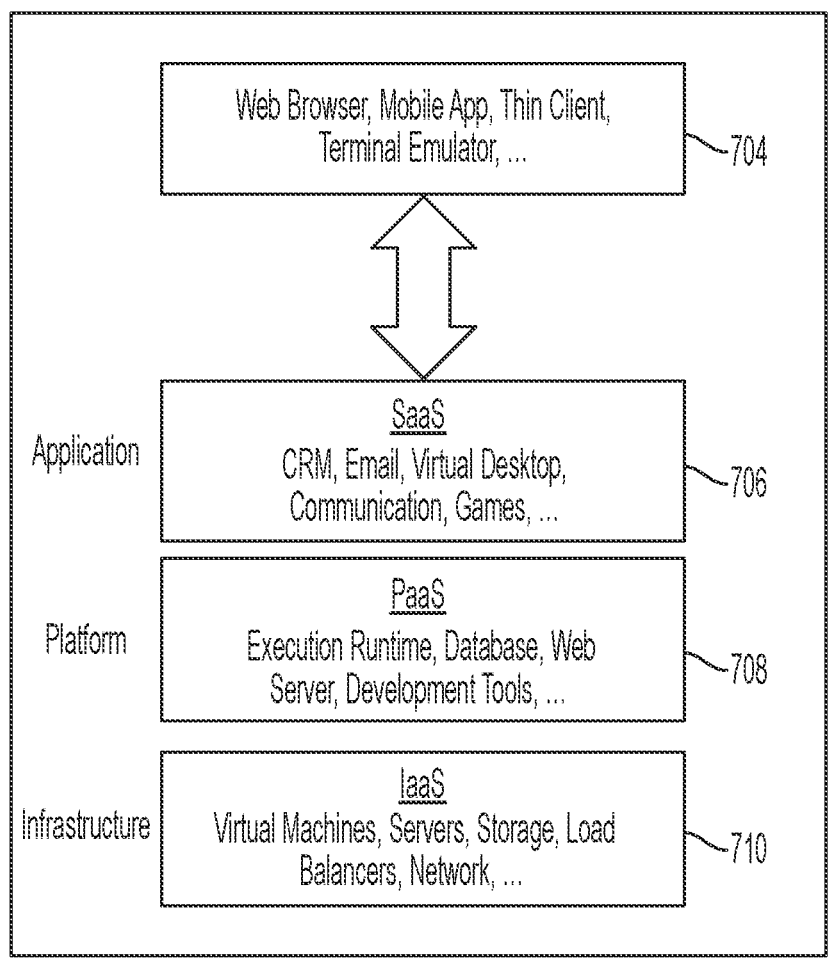

FIG. 6 and FIG. 7 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate. FIG. 6 illustrates an expanded view of the cloud computing/architecture(s) 525 found in FIG. 5. FIG. 7 illustrates the exemplary inventive computer-based components of the present disclosure may be specifically configured to operate in the cloud computing/architecture 525 as a source database 704, where the source database 704 may be a web browser. a mobile application, a thin client, and a terminal emulator. In FIG. 7, the exemplary inventive computer-based systems/platforms, the exemplary inventive computer-based devices, and/or the exemplary inventive computer-based components of the present disclosure may be specifically configured to operate in a cloud computing/architecture such as, but not limiting to: infrastructure a service (IaaS) 710, platform as a service (PaaS) 708, and/or software as a service (SaaS) 706.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; knowledge corpus; stored audio recordings; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. In some embodiments, the server may store transactions and dynamically trained machine learning models. Cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a social media post, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) FreeBSD™, NetBSD™, OpenBSD™; (2) Linux™; (3) Microsoft Windows™; (4) OS X (MacOS)™; (5) MacOS 11™; (6) Solaris™; (7) Android™; (8) iOS™; (9) Embedded Linux™; (10) Tizen™; (11) WebOS™; (12) IBM i™; (13) IBM AIX™; (14) Binary Runtime Environment for Wireless (BREW)™; (15) Cocoa (API)™; (16) Cocoa Touch™; (17) Java Platforms™; (18) JavaFX™; (19) JavaFX Mobile™; (20) Microsoft DirectX™; (21).NET Framework™; (22) Silverlight™; (23) Open Web Platform™; (24) Oracle Database™; (25) Qt™; (26) Eclipse Rich Client Platform™; (27) SAP NetWeaver™; (28) Smartface™; and/or (29) Windows Runtime™.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device. In at least one embodiment, the exemplary spam prevention module 118 of the present disclosure, utilizing at least one machine-learning model described herein, may be referred to as exemplary software.

In some embodiments, exemplary inventive computer-based systems/platforms, exemplary inventive computer-based devices, and/or exemplary inventive computer-based components of the present disclosure may be configured to handle numerous concurrent tests for software agents that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, the exemplary spam prevention module 118 of the present disclosure, utilizing at least one machine-learning model described herein, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

The aforementioned examples are, of course, illustrative and not restrictive.

At least some aspects of the present disclosure will now be described with reference to the following numbered clauses.

Clause 1. A method may include: receiving, by one or more processors, a permission indicator from a computing device of a user identifying a permission by the user to detect a plurality of interaction sessions being initiated by the computing device; registering, by the one or more processors, the computing device of the user to generate user-specific token data; instructing, by the one or more processors, the computing device to monitor for a plurality of activities associated with at least one of the plurality of interaction sessions that the computer device initiates with at least one other computing device associated, based on a prestored database of token data associated with a plurality of entities, with at least one entity; receiving, by the one or more processors and in response to detecting at least one of the plurality of interaction sessions being initiated by the computing device, an indication of a current interaction session being initiated at a current period of time to the at least one other computing device associated with a particular data point stored with the prestored database of token data, where the particular data point is associated with the at least one entity; automatically determining, by the one or more processors and in response to receiving the indication of the current interaction session being initiated at the current period of time, a plurality of indicative vectors associated with the computing device; automatically inputting, by the one or more processors, the plurality of indicative vectors in to at least one machine-learning model to obtain a risk metric associated with the computing device; automatically authenticating, by the one or more processors, the computing device associated with the user based on a comparison of the risk metric to the user-specific token data associated with the user to generate an authentication status associated with the computing device; transmitting, by the one or more processors and based on the authentication status associated with the computing device, the current interaction session to an interaction queue of at least one agent associated with the at least one entity; and automatically generating, by the one or more processors, an interaction script for the at least one agent based on the authentication status and the user-specific token data associated with the user.

Clause 2. The method according to clause 1, where the at least one of the plurality of interaction sessions being initiated by the computing device includes at least one of: a phone call, a conference call, a text message, or an email transmissions.

Clause 3. The method according to clause 1 or 2, where the user-specific token data associated with the user includes personal information of the user, a plurality of preferences associated with the user, and performance information associated with the computing device of the user.

Clause 4. The method according to clause 1, 2 or 3, where the current interaction session is a call; and where the prestored database of token data comprises a plurality of subsets associated with a phone number entered by the user to initiate the call based at least in part on a stored database of one or more phone numbers associated with the at least one entity.

Clause 5. The method according to clause 1, 2, 3 or 4, where the particular data point includes at least one phone number associated with the at least one entity.

Clause 6. The method according to clause 1, 2, 3, 4 or 5, where the indication of the current interaction session being initiated at the current period of time includes a request to automatically authenticate the user after the registering the computing device.

Clause 7. The method according to clause 1, 2, 3, 4, 5 or 6, where the plurality of indicative vectors includes at least one of: a behavioral metric vector, a hardware risk metric vector, or a software risk metric vector.

Clause 8. The method according to clause 1, 2, 3, 4, 5, 6 or 7, further including calculating the risk metric associated with the computing device by aggregating the plurality of indicative vectors and a precalculated risk threshold associated with the computing device based on a plurality of preferences associated with the user.

Clause 9. The method according to clause 1, 2, 3, 4, 5, 6, 7 or 8, where the transmitting the current interaction session to the interaction queue so that the current interaction session is received by the at least one agent includes: placing the current interaction session on hold for a predetermined period of time.

Clause 10. The method according to clause 1, 2, 3, 4, 5, 6, 7, 8 or 9, where the generated script includes a plurality of dialogue lines associated with the token data associated with the user.

Clause 11. The method according to clause 1, 2, 3, 4, 5, 6, 7, 8, 9 or 10, further including automatically displaying, by the one or more processors via at least one graphical user interface with a plurality of programmable elements, a generated script and the authentication status associated with the current interaction session for the at least one agent to utilize during the current interaction session.

Clause 12. A method may include: receiving, by one or more processors, a permission indicator from a computing device of a user identifying a permission by the user to detect a plurality of interaction sessions being initiated by the computing device; registering, by the one or more processors, the computing device of the user to generate user-specific token data; instructing, by the one or more processors, the computing device to monitor for a plurality of activities associated with at least one of the plurality of interaction sessions that the computer device initiates with at least one other computing device associated, based on a prestored database of token data associated with a plurality of entities, with at least one entity; receiving, by the one or more processors and in response to detecting at least one of the plurality of interaction sessions being initiated by the computing device, an indication of a current interaction session being initiated at a current period of time to the at least one other computing device associated with a particular data point stored with the prestored database of token data, wherein the particular data point is associated with the at least one entity; automatically determining, by the one or more processors and in response to receiving the indication of the current interaction session being initiated at the current period of time, a plurality of indicative vectors associated with the computing device; automatically inputting, by the one or more processors, the plurality of indicative vectors in to at least one machine-learning model to obtain a risk metric associated with the computing device; dynamically calculating, by the one or more processors, the risk metric associated with the computing device by aggregating the plurality of indicative vectors and a precalculated risk threshold associated with the computing device based on a plurality of preferences associated with the user; automatically authenticating, by the one or more processors, the computing device associated with the user based on a comparison of the risk metric to the user-specific token data associated with the user to generate an authentication status associated with the computing device; transmitting, by the one or more processors and based on the authentication status associated with the computing device, the current interaction session to an interaction queue of at least one agent associated with the at least one entity; automatically generating, by the one or more processors, an interaction script for the at least one agent based on the authentication status and the user-specific token data associated with the user; and automatically displaying, by the one or more processors via at least one graphical user interface with a plurality of programmable elements, a generated script and the authentication status associated with the current interaction session for the at least one agent to utilize during the current interaction session.

Clause 13. The method according to clause 12, where the at least one of the plurality of interaction sessions being initiated by the computing device includes at least one of: a phone call, a conference call, a text message, or an email transmissions.

Clause 14. The method according to clause 12 or 13, where the user-specific token data associated with the user includes personal information of the user, a plurality of preferences associated with the user, and performance information associated with the computing device of the user Clause 15. The method according to clause 12, 13 or 14, where the prestored database of token data associated with the plurality of users includes a plurality of subsets associated to a phone number entered by the user to initiate calls based at least in part on a stored database of one or more phone numbers associated with at least one entity.

Clause 16. The method according to clause 12, 13, 14 or 15, where the current interaction session is a call; and where the prestored database of token data comprises a plurality of subsets associated with a phone number entered by the user to initiate the call based at least in part on a stored database of one or more phone numbers associated with the at least one entity.

Clause 17. The method according to clause 12, 13, 14, 15 or 16, where the plurality of indicative vectors includes at least one of: a behavioral metric vector, a hardware risk metric vector, or a software risk metric vector.

Clause 18. The method according to clause 12, 13, 14, 15, 16 or 17, where the transmitting the current interaction session to the interaction queue so that the current interaction session is received by the at least one agent includes: placing the current interaction session on hold for a predetermined period of time.

Clause 19. The method according to clause 12, 13, 14, 15, 16, 17 or 18, where the generated script includes a plurality of dialogue lines associated with the token data associated with the user.

Clause 20. A system may include: non-transient computer memory, storing software instructions; and at least one processor of a first computing device associated with a user; where, when the at least one processor executes the software instructions, the first computing device is programmed to: receive, by one or more processors, a permission indicator from a computing device of a user identifying a permission by the user to detect a plurality of interaction sessions being initiated by the computing device; register, by the one or more processors, the computing device of the user to generate user-specific token data; instruct, by the one or more processors, the computing device to monitor for a plurality of activities associated with at least one of the plurality of interaction sessions that the computer device initiates with at least one other computing device associated, based on a prestored database of token data associated with a plurality of entities, with at least one entity; receive, by the one or more processors and in response to detecting at least one of the plurality of interaction sessions being initiated by the computing device, an indication of a current interaction session being initiated at a current period of time to the at least one other computing device associated with a particular data point stored with the prestored database of token data, wherein the particular data point is associated with the at least one entity; automatically determine, by the one or more processors and in response to receiving the indication of the current interaction session being initiated at the current period of time, a plurality of indicative vectors associated with the computing device; automatically input, by the one or more processors, the plurality of indicative vectors in to at least one machine-learning model to obtain a risk metric associated with the computing device; automatically authenticate, by the one or more processors, the computing device associated with the user based on a comparison of the risk metric to the user-specific token data associated with the user to generate an authentication status associated with the computing device; transmit, by the one or more processors and based on the authentication status associated with the computing device, the current interaction session to an interaction queue of at least one agent associated with the at least one entity; and automatically generate, by the one or more processors, an interaction script for the at least one agent based on the authentication status and the user-specific token data associated with the user.

While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

The invention claimed is:

1. A computer-implemented method comprising:
   receiving, by one or more processors, a permission indicator from a computing device of a user identifying a permission by the user to detect a plurality of interaction sessions being initiated by the computing device;
   registering, by the one or more processors, the computing device of the user to generate user-specific token data;
   instructing, by the one or more processors, the computing device to monitor for a plurality of activities associated with at least one of the plurality of interaction sessions that the computer device initiates with at least one other computing device associated, based on a prestored database of token data associated with a plurality of entities, with at least one entity;
   receiving, by the one or more processors and in response to detecting at least one of the plurality of interaction sessions being initiated by the computing device, an indication of a current interaction session being initiated at a current period of time to the at least one other computing device associated with a particular data point stored with the prestored database of token data, wherein the particular data point is associated with the at least one entity;
   automatically determining, by the one or more processors and in response to receiving the indication of the current interaction session being initiated at the current period of time, a plurality of indicative vectors associated with the computing device;
   automatically inputting, by the one or more processors, the plurality of indicative vectors in to at least one machine-learning model to obtain a risk metric associated with the computing device;
   automatically authenticating, by the one or more processors, the computing device associated with the user based on a comparison of the risk metric to the user-specific token data associated with the user to generate an authentication status associated with the computing device;
   transmitting, by the one or more processors and based on the authentication status associated with the computing device, the current interaction session to an interaction queue of at least one agent associated with the at least one entity; and
   automatically generating, by the one or more processors, an interaction script for the at least one agent based on the authentication status and the user-specific token data associated with the user.

2. The computer-implemented method of claim 1, wherein the at least one of the plurality of interaction sessions being initiated by the computing device comprises at least one of: a phone call, a conference call, a text message, or an email transmissions.

3. The computer-implemented method of claim 1, wherein the user-specific token data associated with the user comprises personal information of the user, a plurality of preferences associated with the user, and performance information associated with the computing device of the user.

4. The computer-implemented method of claim 1, wherein the current interaction session is a call; and wherein the prestored database of token data comprises a plurality of subsets associated with a phone number entered by the user to initiate the call based at least in part on a stored database of one or more phone numbers associated with the at least one entity.

5. The computer-implemented method of claim 1, wherein the particular data point comprises at least one phone number associated with the at least one entity.

6. The computer-implemented method of claim 1, wherein the indication of the current interaction session being initiated at the current period of time comprises a request to automatically authenticate the user after the registering the computing device.

7. The computer-implemented method of claim 1, wherein the plurality of indicative vectors comprises at least one of:
   a behavioral metric vector,
   a hardware risk metric vector, or
   a software risk metric vector.

8. The computer-implemented method of claim 1, further comprising calculating the risk metric associated with the computing device by aggregating the plurality of indicative vectors and a precalculated risk threshold associated with the computing device based on a plurality of preferences associated with the user.

9. The computer-implemented method of claim 1, wherein the transmitting the current interaction session to the interaction queue so that the current interaction session is received by the at least one agent comprises:
   placing the current interaction session on hold for a predetermined period of time.

10. The computer-implemented method of claim 1, wherein the generated script comprises a plurality of dialogue lines associated with the token data associated with the user.

11. The computer-implemented method of claim 1, further comprising automatically displaying, by the one or more processors via at least one graphical user interface with a plurality of programmable elements, a generated script and the authentication status associated with the current interaction session for the at least one agent to utilize during the current interaction session.

12. A computer-implemented method comprising:
   receiving, by one or more processors, a permission indicator from a computing device of a user identifying a permission by the user to detect a plurality of interaction sessions being initiated by the computing device;
   registering, by the one or more processors, the computing device of the user to generate user-specific token data;
   instructing, by the one or more processors, the computing device to monitor for a plurality of activities associated with at least one of the plurality of interaction sessions that the computer device initiates with at least one other computing device associated, based on a prestored database of token data associated with a plurality of entities, with at least one entity;
   receiving, by the one or more processors and in response to detecting at least one of the plurality of interaction sessions being initiated by the computing device, an indication of a current interaction session being initiated at a current period of time to the at least one other computing device associated with a particular data point stored with the prestored database of token data, wherein the particular data point is associated with the at least one entity;
   automatically determining, by the one or more processors and in response to receiving the indication of the current interaction session being initiated at the current period of time, a plurality of indicative vectors associated with the computing device;
   automatically inputting, by the one or more processors, the plurality of indicative vectors in to at least one machine-learning model to obtain a risk metric associated with the computing device;
   dynamically calculating, by the one or more processors, the risk metric associated with the computing device by aggregating the plurality of indicative vectors and a precalculated risk threshold associated with the computing device based on a plurality of preferences associated with the user;
   automatically authenticating, by the one or more processors, the computing device associated with the user based on a comparison of the risk metric to the user-specific token data associated with the user to generate an authentication status associated with the computing device;
   transmitting, by the one or more processors and based on the authentication status associated with the computing device, the current interaction session to an interaction queue of at least one agent associated with the at least one entity;
   automatically generating, by the one or more processors, an interaction script for the at least one agent based on the authentication status and the user-specific token data associated with the user; and
   automatically displaying, by the one or more processors via at least one graphical user interface with a plurality of programmable elements, a generated script and the authentication status associated with the current interaction session for the at least one agent to utilize during the current interaction session.

13. The computer-implemented method of claim 12, wherein the at least one of the plurality of interaction sessions being initiated by the computing device comprises at least one of: a phone call, a conference call, a text message, or an email transmissions.

14. The computer-implemented method of claim 12, wherein the user-specific token data associated with the user comprises personal information of the user, a plurality of preferences associated with the user, and performance information associated with the computing device of the user.

15. The computer-implemented method of claim 12, wherein the prestored database of token data associated with the plurality of users comprises a plurality of subsets associated to a phone number entered by the user to initiate calls based at least in part on a stored database of one or more phone numbers associated with at least one entity.

16. The computer-implemented method of claim 12, wherein the current interaction session is a call; and wherein the prestored database of token data comprises a plurality of subsets associated with a phone number entered by the user to initiate the call based at least in part on a stored database of one or more phone numbers associated with the at least one entity.

17. The computer-implemented method of claim 12, wherein the plurality of indicative vectors comprises at least one of:
   a behavioral metric vector;
   a hardware risk metric vector; and
   a software risk metric vector.

18. The computer-implemented method of claim 12, wherein the transmitting the current interaction session to the interaction queue so that the current interaction session is received by the at least one agent comprises:
   placing the current interaction session on hold for a predetermined period of time.

19. The computer-implemented method of claim 12, wherein the generated script comprises a plurality of dialogue lines associated with the token data associated with the user.

20. A system may include:
   a non-transient computer memory, storing software instructions; and
   at least one processor of a first computing device associated with a user;

wherein, when the at least one processor executes the software instructions, the first computing device is programmed to:
- receive, by one or more processors, a permission indicator from a computing device of a user identifying a permission by the user to detect a plurality of interaction sessions being initiated by the computing device;
- register, by the one or more processors, the computing device of the user to generate user-specific token data;
- instruct, by the one or more processors, the computing device to monitor for a plurality of activities associated with at least one of the plurality of interaction sessions that the computer device initiates with at least one other computing device associated, based on a prestored database of token data associated with a plurality of entities, with at least one entity;
- receive, by the one or more processors and in response to detecting at least one of the plurality of interaction sessions being initiated by the computing device, an indication of a current interaction session being initiated at a current period of time to the at least one other computing device associated with a particular data point stored with the prestored database of token data, wherein the particular data point is associated with the at least one entity;
- automatically determine, by the one or more processors and in response to receiving the indication of the current interaction session being initiated at the current period of time, a plurality of indicative vectors associated with the computing device;
- automatically input, by the one or more processors, the plurality of indicative vectors in to at least one machine-learning model to obtain a risk metric associated with the computing device;
- automatically authenticate, by the one or more processors, the computing device associated with the user based on a comparison of the risk metric to the user-specific token data associated with the user to generate an authentication status associated with the computing device;
- transmit, by the one or more processors and based on the authentication status associated with the computing device, the current interaction session to an interaction queue of at least one agent associated with the at least one entity; and
- automatically generate, by the one or more processors, an interaction script for the at least one agent based on the authentication status and the user-specific token data associated with the user.

* * * * *